(12) United States Patent
Usuba

(10) Patent No.: US 7,944,867 B2
(45) Date of Patent: May 17, 2011

(54) COMMUNICATION DEVICE AND COMMUNICATION METHOD

(75) Inventor: Hidemi Usuba, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 881 days.

(21) Appl. No.: 11/816,135

(22) PCT Filed: Feb. 17, 2006

(86) PCT No.: PCT/JP2006/302835
§ 371 (c)(1),
(2), (4) Date: Oct. 17, 2007

(87) PCT Pub. No.: WO2006/088135
PCT Pub. Date: Aug. 24, 2006

(65) Prior Publication Data
US 2009/0040954 A1 Feb. 12, 2009

(30) Foreign Application Priority Data
Feb. 17, 2005 (JP) ................................. 2005-040486

(51) Int. Cl.
*G08C 17/00* (2006.01)
*H04W 4/00* (2009.01)
*H04L 12/28* (2006.01)
*H04B 1/16* (2006.01)

(52) U.S. Cl. ....... 370/311; 370/338; 455/69; 455/343.4; 455/574

(58) Field of Classification Search .................. 370/311, 370/338; 455/69, 343.4, 574
See application file for complete search history.

(56) References Cited

U.S. PATENT DOCUMENTS

| | | | | |
|---|---|---|---|---|
| 6,002,918 A * | 12/1999 | Heiman et al. | ............... | 340/7.38 |
| 7,224,970 B2 * | 5/2007 | Smith et al. | .................. | 455/434 |
| 7,295,827 B2 * | 11/2007 | Liu et al. | .................... | 455/343.2 |
| 7,340,615 B2 * | 3/2008 | Krantz et al. | ................. | 713/300 |
| 7,362,720 B2 * | 4/2008 | Kakumaru et al. | ........... | 370/328 |
| 7,505,795 B1 * | 3/2009 | Lim et al. | ....................... | 455/574 |
| 7,506,188 B2 * | 3/2009 | Krantz et al. | ................. | 713/320 |
| 7,522,564 B2 * | 4/2009 | Kakumaru et al. | ........... | 370/338 |
| 7,529,957 B2 * | 5/2009 | Krantz et al. | ................. | 713/323 |
| 7,551,948 B2 * | 6/2009 | Meier et al. | .................... | 455/574 |
| 7,555,663 B2 * | 6/2009 | Krantz et al. | ................. | 713/324 |
| 7,567,540 B2 * | 7/2009 | Sakoda | ......................... | 370/338 |
| 7,688,772 B2 * | 3/2010 | Sinivaara et al. | ............. | 370/318 |
| 7,756,082 B1 * | 7/2010 | Dhamdhere | .................. | 370/331 |
| 7,787,437 B2 * | 8/2010 | Sakoda | ......................... | 370/350 |
| 7,792,066 B2 * | 9/2010 | Fujii et al. | ...................... | 370/311 |
| 7,853,298 B2 * | 12/2010 | Kakumaru et al. | ........... | 455/574 |
| 2005/0233704 A1 * | 10/2005 | Maekawa | ......................... | 455/69 |

FOREIGN PATENT DOCUMENTS

| | | | |
|---|---|---|---|
| JP | 2001-156788 A | 6/2001 |
| JP | 2002-158609 A | 5/2002 |
| JP | 2003-348104 A | 12/2003 |

(Continued)

*Primary Examiner* — Alpus H Hsu
(74) *Attorney, Agent, or Firm* — Foley & Lardner LLP

(57) ABSTRACT

A control unit controls setting of an operating mode. A timer determines a transmission period of a beacon for notifying presence of a network. A beacon transmitting unit transmits a beacon based on the transmission period. When the control unit instructs to switch from a normal operation mode to a power-saving operation mode, the timer sets a transmission period of the beacon to be longer than a transmission period in the normal operation mode.

11 Claims, 9 Drawing Sheets

FOREIGN PATENT DOCUMENTS

| | | |
|---|---|---|
| JP | 2004-7187 A | 1/2004 |
| JP | 2004-289757 A | 10/2004 |
| JP | 2004-297354 A | 10/2004 |
| JP | 2004-343458 A | 12/2004 |

* cited by examiner

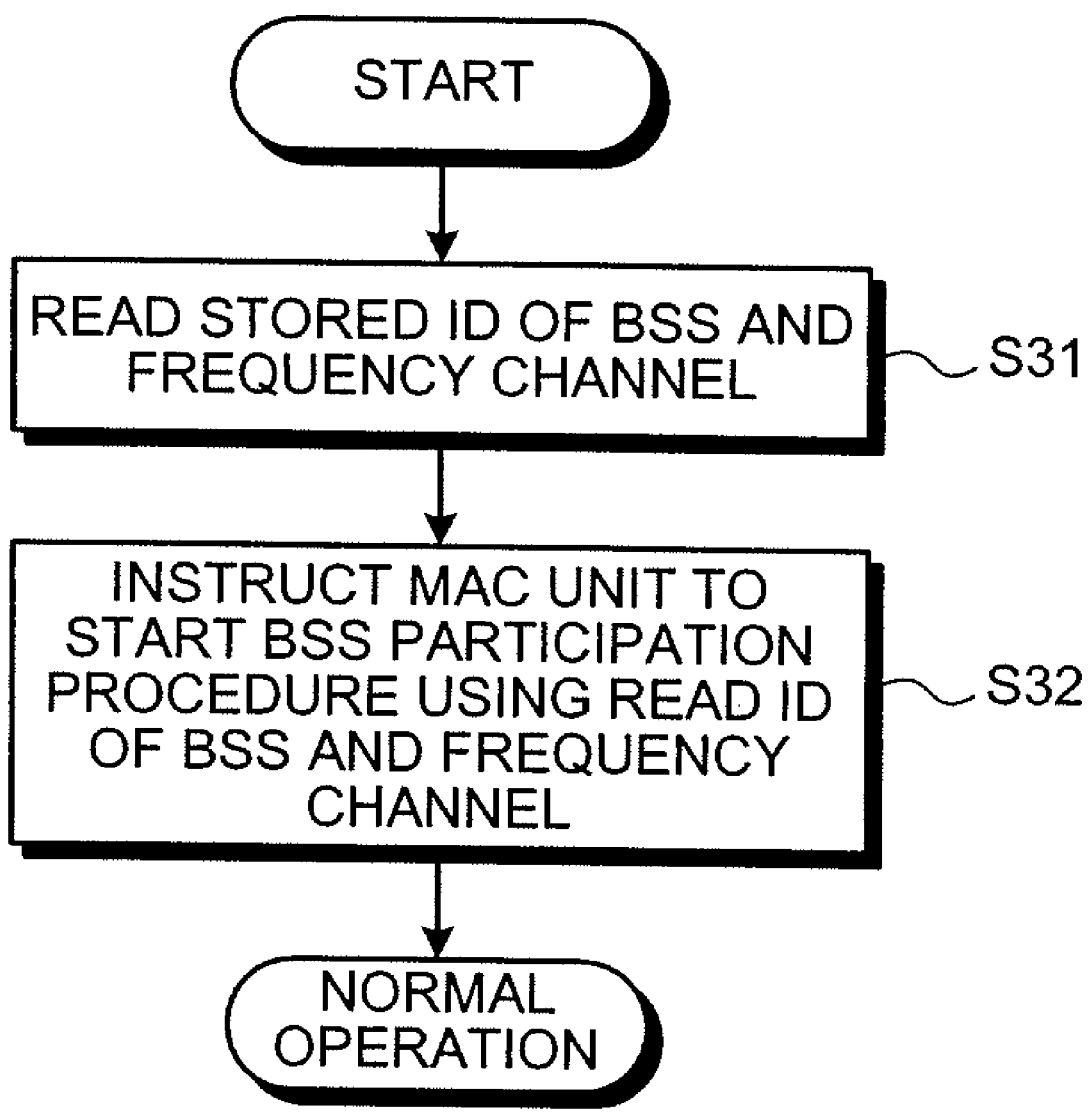

COMMUNICATION DEVICE AND COMMUNICATION METHOD

TECHNICAL FIELD

The present invention relates to a communication device that functions as an access point or a station that configures a radio communication system.

BACKGROUND ART

There are systems that are commercialized in recent years, in which TV broadcasting or analog video signals are A/D-converted, and signals are digitally transmitted by radio so that the TV broadcasting is viewed by a monitor. In the above systems, a data transmitter functions as an access point (AP), and a monitor functions as a station (STA).

The operations of the AP and the STA in the system are briefly explained below. At first, the AP periodically transmits a beacon when power is on, and waits for an association from the STA. On the other hand, the STA detects the beacon to thereby recognize the presence of the AP, and transmits an association signal to the AP to promote the registration of the own device. Thereafter, the STA transmits a signal to request the start of transmission of desired data. The AP starts transmitting specified data based on the signal.

When requesting the AP to stop data transmission, the STA transmits a signal requesting the instruction to stop data transmission to the AP, and then transmits a disassociation signal to delete the registration of the own device.

In the system, however, even if the STA is off, the AP periodically and continuously transmits the beacon, namely the AP is in a standby state in which the AP always waits for an association from the STA. Therefore, it is difficult to achieve low power consumption.

On the other hand, Patent document 1 explained below discloses a method of reducing power consumption in an access point (AP), the reduction having been difficult to be achieved in the system. The method describes the case where a reception-level-detection comparison block is provided to compare a reception level with a predetermined reception level which is previously defined to reduce power consumption in a wireless LAN access point, and where the system is operated in either one of operating modes of a sleep mode (power-saving operation mode) and an active mode (normal mode) according to the comparison result of the reception-level-detection comparison block. The method further describes that if no data is transmitted or received over a predetermined time period during operation in the active mode, the AP switches to the sleep mode.

In Patent document 1 explained below, the AP supplies power only to the reception-level-detection comparison block even in the sleep mode. In other words, the AP does not perform a reception process such as demodulation of signals and analysis of frames in the sleep mode. Furthermore, the AP does not also perform a transmission process in the sleep mode. These features allow realization of low power consumption.

Patent document 1: Japanese Patent Application Laid-Open No. 2001-156788

DISCLOSURE OF INVENTION

Problem to be Solved by the Invention

In the method described in Patent document 1, however, only switching between the sleep mode and the active mode is performed according to a comparison result of reception levels. Therefore, an unnecessary signal may deactivate the sleep mode. For example, a radiowave radiated from a microwave oven and a signal for another BSS (Basic Service Set) transmitted using a same channel or an adjacent channel may sometimes cause the sleep mode to be switched to the active mode. In other words, the method described in Patent document 1 has a problem that the sleep mode cannot be stably maintained.

The method described in Patent document 1 has another problem that because a signal such as a beacon is not transmitted in the sleep mode to a device (STA) on the reception side which is provided with service, the STA cannot recognize the presence of BSS until the sleep mode is switched to the active mode.

The problem to be solved by the present invention includes cases, as examples, where the sleep mode may be deactivated by an unnecessary signal and the STA cannot sometimes recognize the presence of BSS managed by the AP.

Means for Solving Problem

To solve the above problems and to achieve the object, a communication device according to one aspect of the present invention functions as an access point in a radio communication system and notifies presence of a network to each station (STA) in the radio communication system. The communication device includes a control unit that controls setting of an operating mode (a normal operation mode and a power-saving operation mode); a timer that determines a transmission period of a beacon for notifying the presence of the network; a beacon transmitting unit that transmits a beacon based on the transmission period; and a sleep control unit that sets all circuits (including the control unit and the beacon transmitting unit), except for the timer, related to data transmission/reception to be in a sleep state (power-supply stopped state) when the control unit instructs to switch from the normal operation mode to the power-saving operation mode. When the control unit instructs to switch from the normal operation mode to the power-saving operation mode, the timer sets the transmission period of the beacon to be longer than a transmission period in the normal operation mode. During operation in the power-saving operation mode, the timer notifies the sleep control unit of a wake-up request at a timing earlier than a transmission timing of a beacon by a first time, and further notifies the sleep control unit of a sleep request after a second time has passed from the transmission timing of the beacon, and when receiving the wake-up request, the sleep control unit supplies power to a circuit related to a reception process for a network participation request, and puts again the circuit into the sleep state when receiving the sleep request.

Furthermore, a communication device according to another aspect of the present invention functions as a station in a radio communication system including an AP including a mode control unit that controls setting of a normal operation mode and a power-saving operation mode, a timer that determines a transmission period of a beacon for notifying presence of a network, a beacon transmitting unit that transmits a beacon based on the transmission period, and a sleep control unit that sets all circuits (including the mode control unit and the beacon transmitting unit), except for the timer, related to data transmission/reception to be in a power-supply stopped state when the mode control unit instructs to switch from the normal operation mode to the power-saving operation mode, wherein when the mode control unit instructs to switch from the normal operation mode to the power-saving operation mode, the timer sets the transmission period of a beacon so as to be longer than that in the normal operation mode, further, during operation in the power-saving operation mode, the timer notifies the sleep control unit of a wake-up request at a timing earlier, by a first time, than a transmission timing of a beacon which is transmitted at a longer interval than that in the normal operation mode, and further notifies the sleep control unit of a sleep request after a second time has passed from the transmission timing of the beacon, and when receiving the wake-up request, the sleep control unit supplies power to a circuit related to a reception process for a network participation request, and puts again the circuit into the power-supply stopped state when receiving the sleep request, and that recognizes presence of a network by a beacon sent from the AP in the radio communication system. The communication device includes a control unit that controls a participation in the network; a beacon receiving unit that receives a beacon transmitted by the AP; and a network-participation-procedure control unit that transmits a network participation request based on a network-participation-procedure start request sent from the control unit. The network-participation-procedure control unit transmits the network participation request during a time period until the second time has passed in the AP time after reception of a beacon that is transmitted at a longer interval than that in the normal operation mode, during operation of the AP in the power-saving operation mode.

Moreover, a communication method according to still another aspect of the present invention is implemented by a communication device that functions as an access point (AP) in a radio communication system when the AP notifies presence of a network to a communication device that functions as a station (STA) in the radio communication system by a beacon. The communication method includes switching to a power-saving operation mode, when a total number of STAs participating in the network becomes zero or when no signal is received from any one of the STAs participating in the network over a predetermined time period during operation in a normal operation mode, setting a transmission period of a beacon to be longer than a transmission period thereof in the normal operation mode, and setting all circuits, except for a timer, related to data transmission/reception to be in a sleep state (power-supply stopped state); a supplying power to a circuit related to a reception process for a network participation request at a timing earlier, by a first time, than a transmission timing of a beacon which is transmitted at a longer interval than that in the normal operation mode, during operation in the power-saving operation mode from the transmission timing of the beacon; and switching to the normal operation mode when the AP receives the network participation request from the STA during a time period from the transmission timing of the beacon to the passage of the second time, during operation in the power-saving operation mode, and returning the transmission period of the beacon to the transmission period in the normal operation mode.

BRIEF DESCRIPTION OF DRAWINGS

FIG. 3-1 is a diagram of a beacon transmission timing and a timing of supplying power to a transmission processing unit, a reception processing unit, and to a baseband block in a normal operation mode.

FIG. 3-2 is a diagram of a beacon transmission timing and a timing of supplying power to the transmission processing unit, the reception processing unit, and to the baseband block in a power-saving operation mode.

FIG. 10 is a flowchart of the process in a control unit in the station.

EXPLANATIONS OF LETTERS OR NUMERALS

Figure 1:
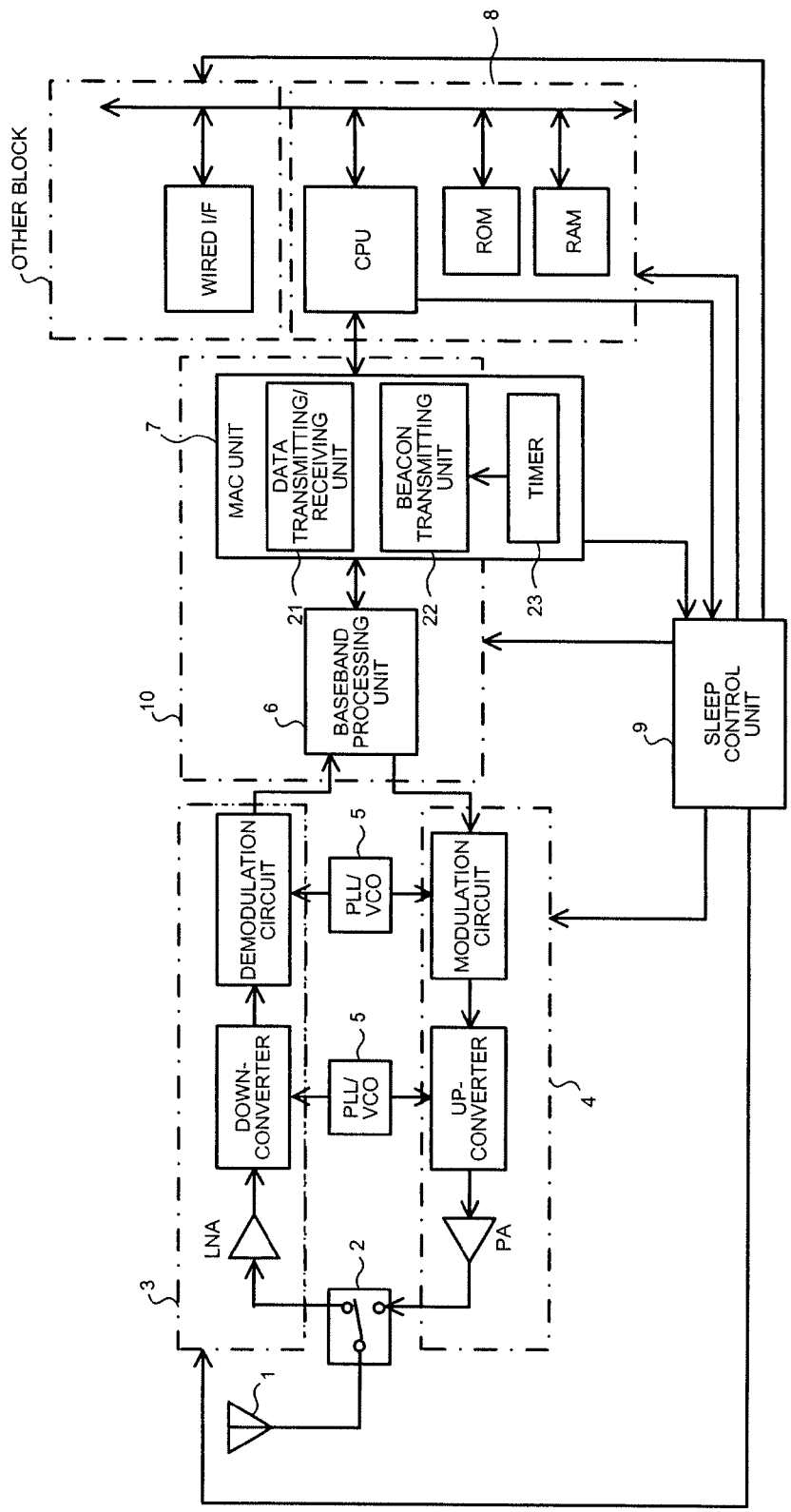
FIG. 1 is a diagram of an example of the configuration of an access point according to a first embodiment.

1 Antenna
2 Selector switch
3 Reception processing unit
4 Transmission processing unit
5 PLL/VCO
6 Baseband processing unit
7, 7a, 11, 11a MAC unit
8, 8a, 12, 12a Control unit
9 Sleep control unit
10, 10a Baseband block
21, 31 Data transmitting/receiving unit
22 Beacon transmitting unit
23, 23a Timer
32 Beacon receiving unit
33 BSS-participation-procedure control unit
34 BSS-participation-signal transmitting unit
41 Nonvolatile memory

BEST MODE(S) FOR CARRYING OUT THE INVENTION

Exemplary embodiments of a communication device and a communication method according to the present invention are explained in detail below with reference to the accompanying drawings. The present invention is not limited by these embodiments.

First Embodiment

FIG. 1 is a diagram of an example of the configuration of an access point (AP), according to a first embodiment, which functions as the communication device of the present invention. The AP includes an antenna 1, a selector switch 2 for transmission/reception, a reception processing unit 3 that performs a predetermined reception process; a transmission processing unit 4 that performs a predetermined transmission process, a PLL/VCO 5 that supplies clock to the reception processing unit 3 and the transmission processing unit 4, a baseband processing unit 6 that performs a predetermined baseband process, a MAC unit 7 that includes a data transmitting/receiving unit 21, a beacon transmitting unit 22, and a timer 23 which determines a beacon transmission period; a control unit 8 that includes a CPU that controls a communication method (method of setting an operating mode (normal operation mode, power-saving operation mode)) according to the first embodiment in the AP, a ROM that stores therein programs, and a RAM that stores therein data generated during the processes; and a sleep control unit 9 that controls a sleep state based on a notification for receipt of a wake-up request, a sleep request, and a BSS participation request from the MAC unit 7.

The "Other block" shown in FIG. 1 is different in its configuration depending on data transmitted (distributed) by the AP according to the present embodiment. For example, if the AP is a device that distributes video, then the device includes a television tuner and an MPEG encoder instead of a wired I/F. A baseband block 10 includes the baseband processing unit 6, the data transmitting/receiving unit 21, and the beacon transmitting unit 22. The sleep state of the baseband block 10 is controlled by the sleep control unit 9. The timer 23 is used to determine a timing of notifying the sleep control unit 9 of the wake-up request and the sleep request.

The reception processing unit 3 includes a low noise amplifier (LNA) that amplifies input from the antenna, a down-converter that converts a reception frequency to an intermediate frequency, and a demodulation circuit that demodulates the intermediate frequency to a baseband IQ signal. The transmission processing unit 4 includes a modulation circuit that modulates the baseband IQ signal to an intermediate frequency, an up-converter that converts the intermediate frequency to a transmission frequency, and a power amplifier (PA) to increase transmission output.

Figure 2:
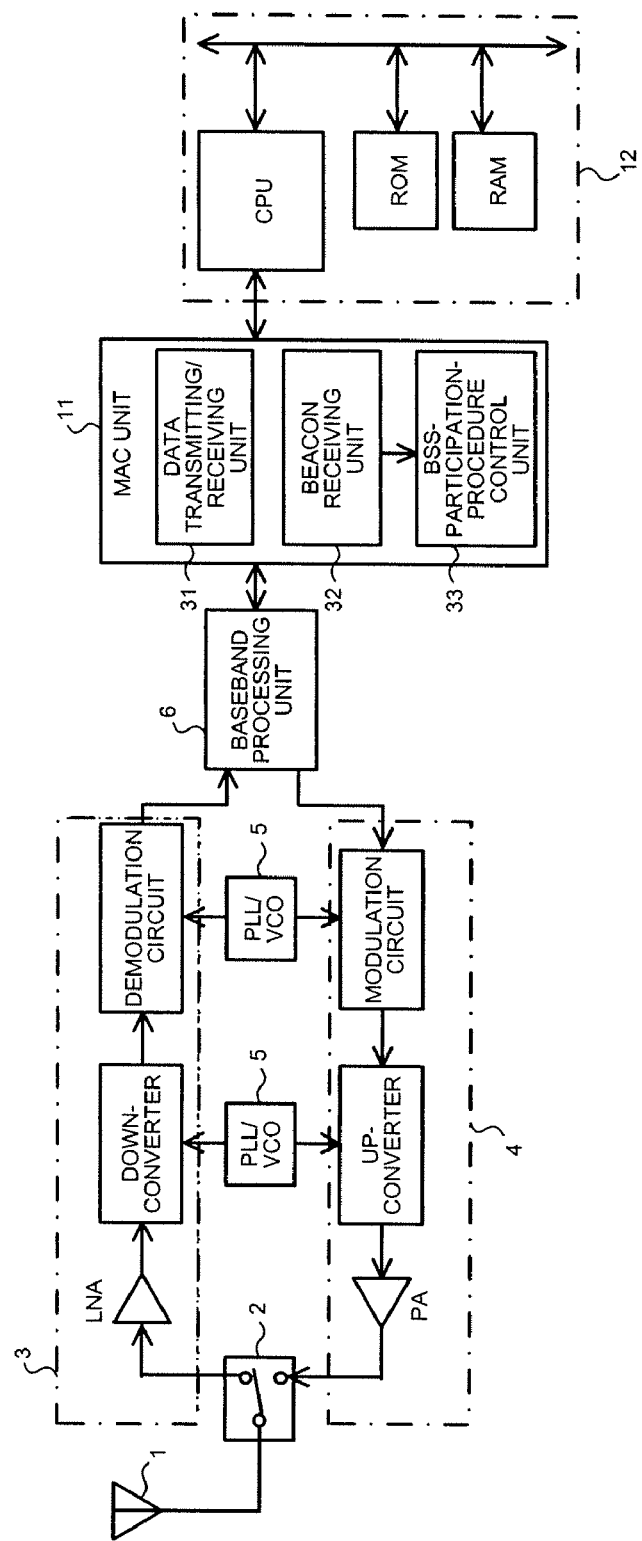
FIG. 2 is a diagram of an example of the configuration of a station according to the first embodiment.

FIG. 2 is a diagram of an example of the configuration of a station (STA) according to the first embodiment. The same reference numerals are assigned to those corresponding to the components of the AP, and explanation thereof is omitted. In addition to the antenna 1, the selector switch 2, the reception processing unit 3, the transmission processing unit 4, the PLL/VCO 5, and the baseband processing unit 6 similarly to the AP, the STA further includes a MAC unit 11 that includes a data transmitting/receiving unit 31, a beacon receiving unit 32, and a BSS-participation-procedure control unit 33 that controls its participation in the BSS managed by the AP based on beacon reception notified from the beacon receiving unit 32; and a control unit 12 that includes a CPU which controls a communication method in the STA, a ROM which stores therein programs, and a RAM which stores therein data generated during the processes.

The operation of the AP configured in the above manner is explained below. The AP in the present embodiment has a function of operating in the normal operation mode and the power-saving operation mode, and operates in either one of the operating modes according to a communication situation.

In the normal operation mode, in the AP, the control unit 8 controls the sleep control unit 9 to constantly supply power to the control unit 8 and the baseband block 10. When data is transmitted, a switching mechanism (not shown) is used to supply power to the transmission processing unit 4, and to supply power to the reception processing unit 3 when data is not transmitted.

The beacon transmitting unit 22 in the MAC unit 7 periodically transmits beacons. A beacon transmission period is determined by the timer 23 in the MAC unit 7. The beacon transmission is performed to notify an STA, which is to participate in the BSS managed by the AP, of the presence of the BSS. The beacon transmission is also used to establish system clock synchronization between STAs participating in the BSS. The beacon transmission period is generally set to about 100 msec.

When the AP has received an association frame from an STA to participate in the BSS managed by the own device, through a predetermined reception process, the data transmitting/receiving unit 21 in the MAC unit 7 notifies the control unit 8 that a new STA has participated in the BSS (STA participation notification). In the normal operation mode, the AP is necessary to receive the association frame and data frames from STAs participating in the BSS. Therefore, the power is supplied to the reception processing unit 3 during any time period other than that of frame transmission, while the power is constantly supplied to the baseband block 10.

When the AP has received a disassociation frame (or deauthentication frame) from an STA to leave the BSS, the data transmitting/receiving unit 21 in the MAC unit 7 notifies the control unit 8 that the STA has left the BSS (STA disassociation notification). The control unit 8 receives the STA participation notification and the STA disassociation notification transmitted from the data transmitting/receiving unit 21, and thereby manages the total number of STAs participating in the BSS.

On the other hand, when the total number of STAs participating in the BSS becomes zero during operation in the normal operation mode, the AP switches to the power-saving operation mode.

When the AP has switched to the power-saving operation mode, the control unit 8 instructs the MAC unit 7 and the sleep control unit 9 to perform the operation in the power-saving operation mode. Further, if any data transmission to the STA participating therein is performed, then the data transmission is stopped.

The operation of the MAC unit 7 in the power-saving operation mode is explained below. The MAC unit 7 sets a period of the timer 23, which determines a beacon transmission interval, so that the period is longer than a set value in the normal operation mode (e.g., 2 sec.). Moreover, the MAC unit 7 sets the timer 23 so that a wake-up request is notified to the sleep control unit 9 at a timing earlier by a predetermined time than a beacon transmission timing. The MAC unit 7 further sets the timer 23 so that a sleep request is notified to the sleep control unit 9 after a predetermined time has passed (e.g., after 100 msec.) from the beacon transmission timing.

The operation of the sleep control unit 9 in the power-saving operation mode is explained below. When the AP has switched to the power-saving operation mode, the sleep control unit 9 puts all blocks (which correspond to the reception processing unit 3, the transmission processing unit 4, the baseband block 10, and the control unit 8 in FIG. 1) into a sleep state (power supply is stopped). When receiving a wake-up request from the timer 23 in the MAC unit 7, the sleep control unit 9 wakes up the reception processing unit 3, the transmission processing unit 4, and the baseband block 10 (power supply is started). When receiving the sleep request from the timer 23 in the MAC unit 7, the sleep control unit 9 puts the reception processing unit 3, the transmission processing unit 4, and the baseband block 10 into the sleep state. When the reception processing unit 3, the transmission processing unit 4, and the baseband block 10 are awake, the switching mechanism (not shown) supplies the power to the transmission processing unit 4 when any frame such as a beacon is transmitted, and supplies the power to the reception processing unit 3 when no frame is transmitted.

In the AP, when the data stored in the RAM or the data and beacon from the wired I/F is transmitted, and when the association frame and the disassociation frame are received, the control unit 8 controls the transmission/reception process according to, for example, the protocol for a wireless LAN. As one example, when the data stored in the RAM or the data from the wired I/F is transmitted, the control unit 8 controls to radiate a radiowave from the antenna 1 as the data via the data transmitting/receiving unit 21 in the MAC unit 7, the baseband processing unit 6, the transmission processing unit 4, and the selector switch 2. On the other hand, the control unit 8 controls to notify the CPU of the radiowave received by the antenna 1 as received data (which corresponds to the association frame and the disassociation frame) via the selector switch 2, the reception processing unit 3, the baseband processing unit 6, and the data transmitting/receiving unit 21 in the MAC unit 7.

The operation of the STA configured in the above manner is explained below. When the STA has received the beacon from the AP, the beacon receiving unit 32 in the MAC unit 11 notifies the BSS-participation-procedure control unit 33 and the control unit 12 of beacon reception, and the control unit 12 requests to start a procedure for participation in the BSS (BSS-participation-procedure start request) as required. The BSS-participation-procedure control unit 33 receives the BSS-participation-procedure start request, waits for a beacon reception notification sent from the beacon receiving unit 32, and transmits an association frame to the AP upon receipt of the beacon reception notification (when a WEP code is used, an authentication frame is transmitted to the AP before the association is transmitted, and authentication is performed therein).

However, as explained above, the AP according to the present embodiment can receive the association frame from an STA only within a predetermined time from transmission of a beacon during operation in the power-saving operation mode. Therefore, the STA according to the present embodiment is caused to transmit the association (also the authentication if necessary) within the time.

On the other hand, when the STA is to disassociate from the BSS, the BSS-participation-procedure control unit 33 transmits the disassociation frame to the AP instructed by the control unit 12 (when the WEP code is used, the deauthentication frame is transmitted after the disassociation frame is transmitted).

When the STA transmits the association frame or the disassociation frame and receives the data or the beacon distributed from the AP, the control unit 12 controls the transmission/reception process according to the protocol for the wireless LAN. As one example, when the STA is to transmit the association frame, the control unit 12 controls to radiate a radiowave from the antenna 1 as the frame via the data transmitting/receiving unit 31 in the MAC unit 11, the baseband processing unit 6, the transmission processing unit 4, and the selector switch 2. On the other hand, the control unit 12 controls to notify the CPU of the radiowave received by the antenna 1 as received data (which corresponds to the data distributed from the AP), via the selector switch 2, the reception processing unit 3, the baseband processing unit 6, and the data transmitting/receiving unit 31 in the MAC unit 11.

Figures 1, 3:
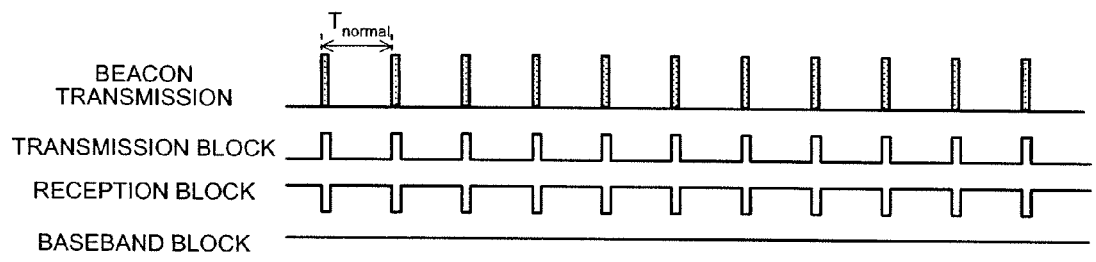
Figures 2, 3:
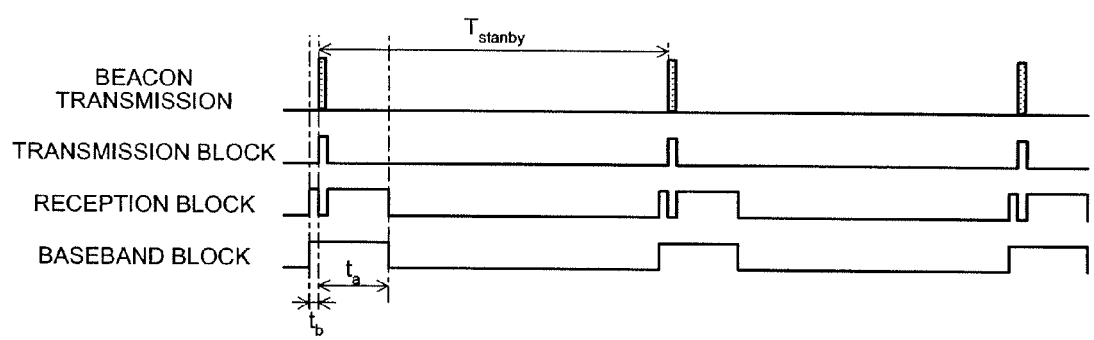

A series of operations in the AP is explained below in time series. FIG. 3-1 is a diagram of a beacon transmission timing and a timing of supplying power to the transmission processing unit 4, the reception processing unit 3, and to the baseband block 10 in the normal operation mode. FIG. 3-2 is a diagram of a beacon transmission timing and a timing of supplying power to the transmission processing unit 4, the reception processing unit 3, and to the baseband block 10 in the power-saving operation mode.

In FIG. 3-1, $T_{normal}$ represents a beacon period in the normal operation mode. In FIG. 3-2, $T_{stanby}$ represents a beacon period in the power-saving operation mode, $t_a$ represents a time until the timer 23 notifies the sleep request after transmission of the beacon, and $t_b$ represents a time before transmission of the beacon indicating that the timer 23 notifies the wake-up request.

When receiving the association frame, for example, during the time $t_a$, the MAC unit 7 notifies the sleep control unit 9 of receipt of the BSS participation request. When receiving the authentication frame during the time $t_a$ and if it is determined that the authentication is verified, the MAC unit 7 notifies the sleep control unit 9 of receipt of the BSS participation request. The sleep control unit 9 receives the notification and wakes up the control unit 8 (may also wake up the other block). The control unit 8 after being woken receives the STA participation notification from the data transmitting/receiving unit 21 in the MAC unit 7, and sets the MAC unit 7 and the sleep control unit 9 to be in the normal operation mode. When the mode is set to the normal operation mode, the MAC unit 7 changes the beacon transmission period to a set value in the normal operation mode.

Determination conditions to switch from the normal operation mode to the power-saving operation mode may include not only the case where the number of STAs becomes zero but also the case where no signal is received from any one of the STAs participating in the BSS over a predetermined time period. The latter case is based on the assumption of a case where the STAs participating in the BSS move and each distance with the AP thereby increases in such a manner that it may be failed to transmit a disconnection frame. For example, if the power to the STA is turned off at a location remotely away from the AP, the disconnection frame is unsuccessfully transmitted, and thus, the total number of STAs managed by the control unit 8 does not become zero. Hence, if no signal is received from any one of the STAs participating in the BSS for the predetermined time period, the control unit 8 regards this case as one where there is no STA participating in the BSS, and switches to the power-saving operation mode.

Figure 4:
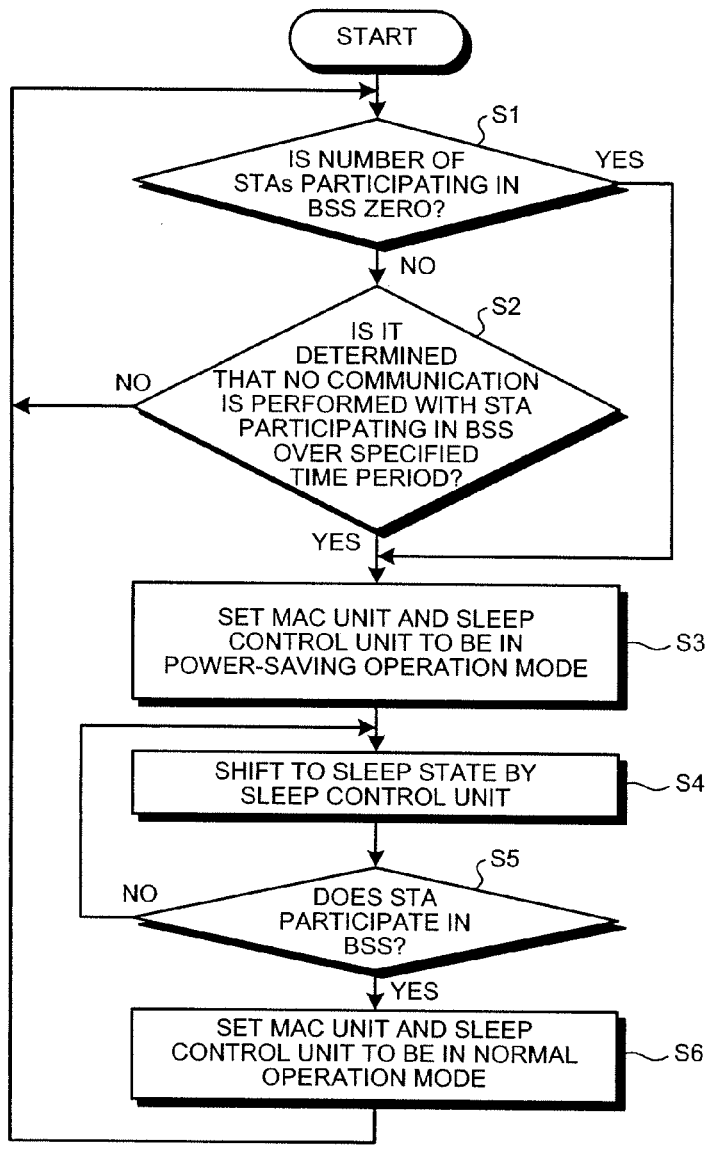
FIG. 4 is a flowchart of the process in a control unit in the access point.
Figure 5:
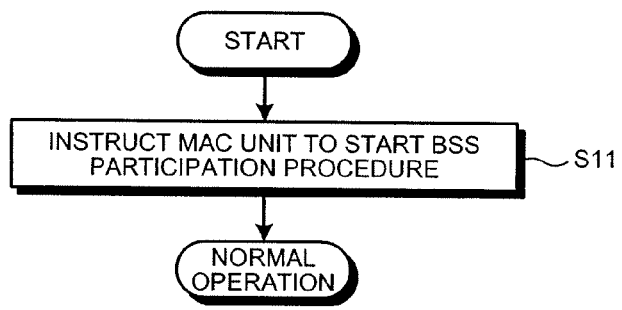
FIG. 5 is a flowchart of the process in a control unit in the station.

One examples of the process in the control unit 8 in the AP and the process in the control unit 12 in the STA are explained below with reference to the drawings. FIG. 4 is a flowchart of the process in the control unit 8 in the AP, and FIG. 5 is a flowchart of the process in the control unit 12 in the STA.

At first, the control unit 8 in the AP determines whether the number of STAs participating in the BSS currently managed by the own device is zero, or determines whether no communication is performed with any one of the STAs participating in the BSS over a predetermined time period (steps S1 and S2 in FIG. 4). For example, if it is determined that there is an STA participating in the BSS (No at step S1) and if it is determined that the communication is performed with an STA participating in the BSS (No at step S2), the control unit 8 repeatedly executes the determination processes.

In the determination processes, if it is determined that the number of STAs participating in the BSS becomes zero (Yes at step S1) or if it is determined that no communication is performed with any one of the STAs participating in the BSS (Yes at step S2), the control unit 8 sets the MAC unit 7 and the sleep control unit 9 to be in the power-saving operation mode (step S3). And the control unit 8 switches to the sleep state by the instruction from the sleep control unit 9 (step S4).

After that, if a new STA participates in the BSS, the control unit 8 wakes up by the instruction of the sleep control unit 9 (Yes at step S5), and sets the MAC unit 7 and the sleep control unit 9 to be in the normal operation mode (step S6). Thereafter, the control unit 8 repeatedly executes the processes at steps S1 to S6.

On the other hand, the control unit 12 in the STA instructs the MAC unit 11 to start a BSS participation procedure if necessary (step S11 in FIG. 5).

As explained above, the present embodiment is configured to always supply power only to the timer and the sleep control unit in the power-saving operation mode, to periodically supply power to the baseband block and the reception processing unit, to demodulate the signal received within the time during which power is supplied, and to analyze a received frame. With this feature, the association frame can be reliably recognized even in the power-saving operation mode in the time during which power is supplied to the baseband block and the reception processing unit, and it is thereby prevented to switch from the power-saving operation mode to the normal operation mode due to noise unlike the conventional technology. Thus, the power-saving operation mode can be stably maintained.

The present embodiment is also configured to periodically transmit a beacon to STAs even in the power-saving operation mode, and thus the presence of BSS can always be notified to the STAs.

Second Embodiment

Figure 6:
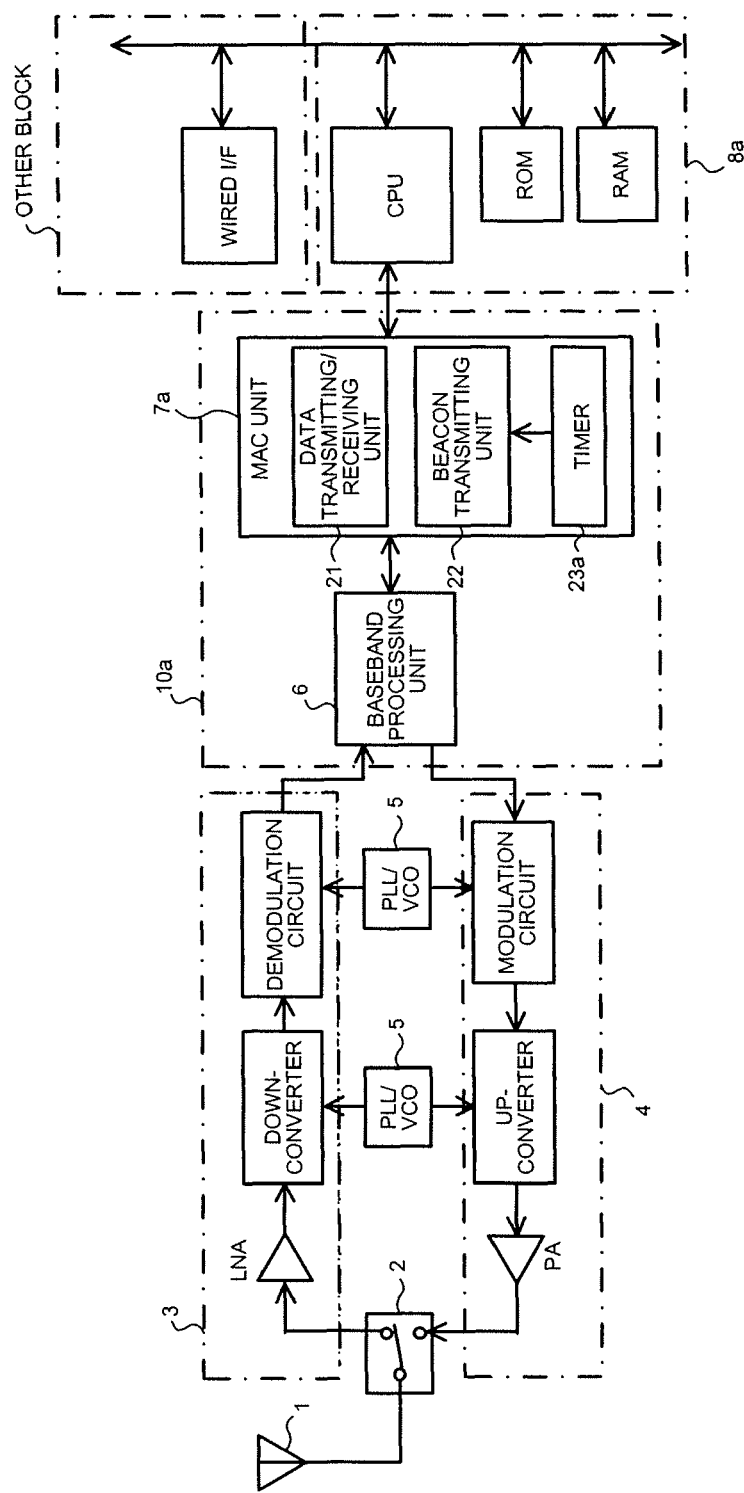
FIG. 6 is a diagram of an example of the configuration of an access point according to a second embodiment.

FIG. 6 is a diagram of an example of the configuration of an access point (AP), according to a second embodiment, which functions as the communication device according to the present invention. The same reference numerals are assigned to those corresponding to the components of the first embodiment, and the explanation thereof is omitted. In the present embodiment, only components and processes different from these of the first embodiment are explained below.

In addition to the antenna 1, the selector switch 2, the reception processing unit 3, the transmission processing unit 4, the PLL/VCO 5, and the baseband processing unit 6 according to the first embodiment, the AP of the present embodiment includes a MAC unit 7a that includes a timer 23a which determines a beacon transmission period (which does not determine a timing of notifying a wake-up request and a sleep request, unlike the first embodiment); and a control unit 8a that includes a CPU which controls a communication method according to the second embodiment in the AP, a ROM, and a RAM. A baseband block 10a includes the baseband processing unit 6, the data transmitting/receiving unit 21, the beacon transmitting unit 22, and the timer 23a.

The operation of the AP configured in the above manner is explained below. The AP of the present embodiment switches to the power-saving operation mode, for example, when the total number of the STAs participating in the BSS becomes zero or when no communication is performed with any one of the STAs participating in the BSS over a predetermined time period, during operation in the normal operation mode (like the first embodiment: see FIG. 3-1). When the AP has switched to the power-saving operation mode, the control unit 8a instructs the MAC unit 7a to perform the operation in the power-saving operation mode. The MAC unit 7a sets the period of the timer 23a, which determines a beacon transmission interval, to be longer than a set value in the normal operation mode (e.g., 2 sec.).

Figure 7:
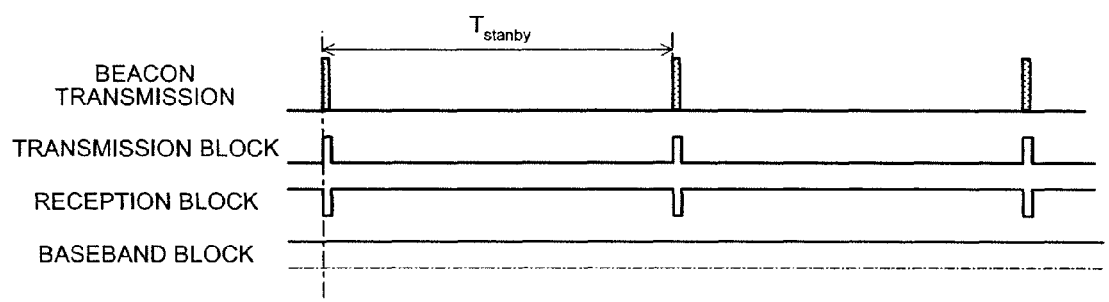
FIG. 7 is a diagram of a beacon transmission timing and a timing of supplying power to the transmission processing unit, the reception processing unit, and to the baseband block in the power-saving operation mode.

FIG. 7 is a diagram of a beacon transmission timing and a timing of supplying power to the transmission processing unit 4, the reception processing unit 3, and to the baseband block 10a in the power-saving operation mode. In this figure, $T_{stanby}$ ($>T_{normal}$) represents a beacon period in the power-saving operation mode.

Figure 8:
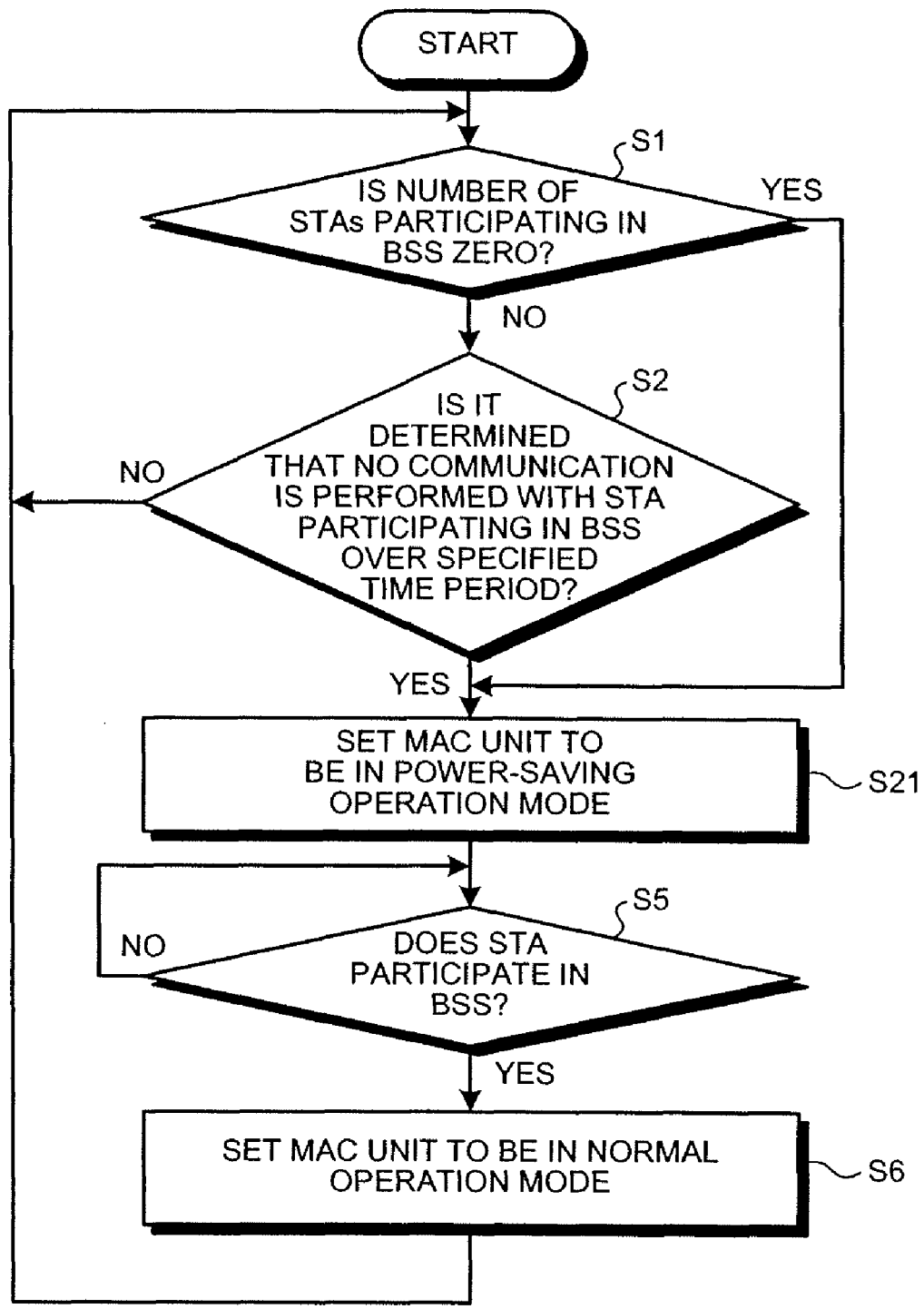
FIG. 8 is a flowchart of the process in a control unit in the access point.

FIG. 8 is a flowchart of the process in the control unit 8a in the AP. In the determination processes at steps S1 and S2, if the number of STAs participating in the BSS becomes zero (Yes at step S1), or if it is determined that no communication is performed with any one of the STAs participating in the BSS for the predetermined time period (Yes at step S2), the control unit 8a sets the MAC unit 7a to be in the power-saving operation mode (step S21).

The station (STA) operates basically in the same manner as that of the first embodiment. However, the AP of the present embodiment can always receive an association frame from an STA even in the power-saving operation mode. Therefore, the STA of the present embodiment transmits the association (authentication if necessary) at an arbitrary timing.

As explained above, in the present embodiment, the same effect as that of the first embodiment can be obtained with the simpler configuration, and at the same time the transmission frequency of the beacon per unit time is decreased, thus reducing power consumption.

Third Embodiment

The process of a third embodiment is explained below. It is noted that the configuration of the AP according to the third embodiment is the same as that of FIG. 6 according to the second embodiment. In the present embodiment, only the process different from that of the first embodiment or the second embodiment is explained.

The AP of the third embodiment causes the MAC unit 7a to stop transmitting the beacon in the power-saving operation mode. Namely, in this case, the operation of the timer 23a is stopped. On the other hand, if a new STA participates in the BSS, the operation of the timer 23a is restarted. It is noted that the power supply state in the power-saving operation mode is the same as that in the normal mode, and thus the power is supplied to the reception processing unit 3 and the baseband block 10a.

Figure 9:
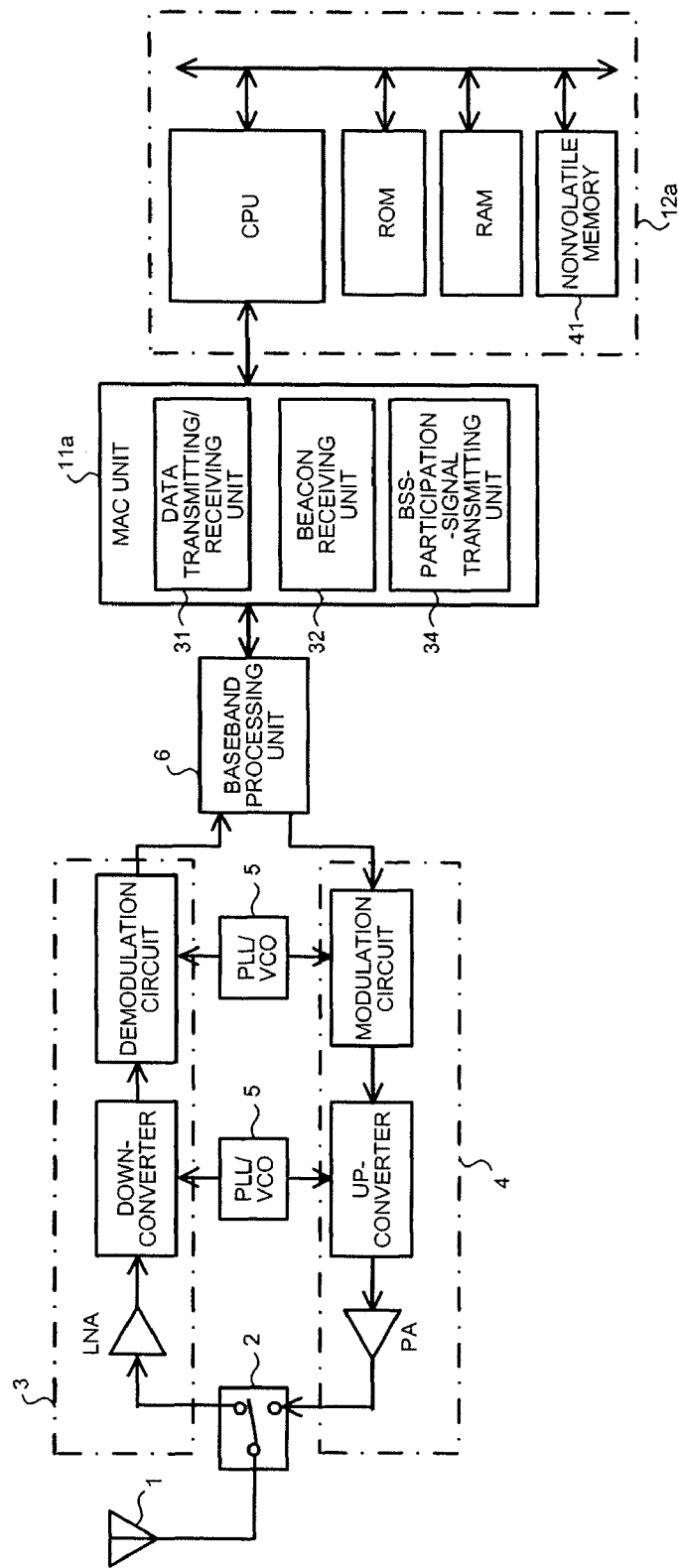
FIG. 9 is a diagram of an example of the configuration of a station according to a third embodiment.

In the present embodiment, the STA has the configuration as follows. FIG. 9 is a diagram of an example of the configuration of a station (STA) according to the third embodiment. The same reference numerals are assigned to those corresponding to the components of the first embodiment, and the explanation thereof is omitted.

The STA of the present embodiment includes a MAC unit 11a that includes a BSS-participation-signal transmitting unit 34 which transmits a signal for participation in the BSS managed by the AP; and a control unit 12a that includes a CPU which controls a communication method according to the third embodiment in the STA, a ROM, a RAM, and a nonvolatile memory 41.

FIG. 10 is a flowchart of the process in the control unit 12a in the STA. In the STA of the present embodiment, the control unit 12a stores an ID of the BSS to which the association has been once transmitted and a frequency channel, in the nonvolatile memory 41. If the STA is desired to participate in the BSS, the STA reads the content from the nonvolatile memory 41 without reception of the beacon (step S31), and instructs the BSS-participation-signal transmitting unit 34 to start the BSS participation procedure based on the content (step S32). In the STA, the BSS-participation-signal transmitting unit 34 transmits the association frame to the AP, which manages the BSS, to participate in a desired BSS.

As explained above, in the present embodiment, the same effect as that of the first or the second embodiment can be obtained with the simple configuration even if the beacon is stopped in the power-saving operation mode.

According to the embodiments, the case where it is assumed that the wireless LAN system is used as the network system is described. However, the present invention is not limited to the case. Therefore, the communication device and the communication method according to the present invention can be used in any system in which a parent station periodically transmits a beacon to notify child stations, which are present around the parent station, of the presence of network service to be provided. The present invention is also applicable to a wireless PAN (Personal Area Network) such as Bluetooth and UWB (Ultra Wide Band). It is noted that in the wireless PAN, "piconet" is a term corresponding to the BSS.

The invention claimed is:

1. A communication device that functions as an access point in a radio communication system and notifies presence of a network to a station in the radio communication system, the communication device comprising:
 a control unit that controls setting of an operating mode including a normal operation mode and a power-saving operation mode;
 a timer that determines a transmission period of a beacon for notifying the presence of the network;
 a beacon transmitting unit that transmits the beacon to the station based on the transmission period; and
 a sleep control unit that sets all circuits other than the timer and the sleep control unit, to be in a sleep state when the control unit instructs to switch from the normal operation mode to the power-saving operation mode, wherein
 when the control unit instructs to switch from the normal operation mode to the power-saving operation mode, the timer sets the transmission period of the beacon to be longer than a transmission period in the normal operation mode, and
 during operation in the power-saving operation mode, the timer notifies a wake-up request at a timing earlier than a transmission timing of the beacon by a first time to the sleep control unit and further notifies a sleep request after a second time has passed from the transmission timing of the beacon to the sleep control unit, and when receiving the wake-up request, the sleep control unit supplies a power to circuits except the timer, the sleep control unit, and the control unit, and resets the circuits except the timer, the sleep control unit, and the control unit to be in the sleep state when receiving the sleep request.

2. The communication device according to claim 1, wherein the sleep control unit supplies the power to the control unit when the communication device receives a network participation request from the station during a time period from the transmission timing of the beacon to a passage of the second time, during operation in the power-saving operation mode, and controls to return the transmission period of the beacon to the transmission period in the normal operation mode when the control unit instructs to switch from the power-saving operation mode to the normal operation mode.

3. The communication device according to claim 1, wherein the control unit instructs to switch to the power-saving operation mode when a total number of stations participating in the network becomes zero or when no signal is received from any one of the stations participating in the network over a predetermined time period during operation in the normal operation mode.

4. The communication device according to claim 1, wherein the network is a basic service set in a wireless local area network system.

5. The communication device according to claim 1, wherein the network is a piconet in a wireless personal area network system.

6. A communication device that functions as a station in a radio communication system including an access point that includes a mode control unit that controls setting of a normal operation mode and a power-saving operation mode, a timer that determines a transmission period of a beacon for notifying presence of a network, a beacon transmitting unit that transmits the beacon based on the transmission period, and a sleep control unit that sets all circuits including the mode control unit and the beacon transmitting unit other than the timer, which are related to data transmission/reception, to be in a sleep state when the mode control unit instructs to switch from the normal operation mode to the power-saving operation mode, wherein when the mode control unit instructs to switch from the normal operation mode to the power-saving operation mode, the timer sets the transmission period of the beacon so as to be longer than that in the normal operation mode, during operation in the power-saving operation mode, the timer notifies a wake-up request at a timing earlier to the sleep control unit, by a first time, than a transmission timing of the beacon that is transmitted at a longer interval than that in the normal operation mode, further notifies a sleep request after a second time has passed from the transmission timing of the beacon to the sleep control unit, when receiving the wake-up request, the sleep control unit supplies a power to circuits except the timer, the sleep control unit, and the control unit, and resets the circuits except the timer, the sleep control unit, and the control unit to be in the sleep state when receiving the sleep request, and that recognizes the presence of the network by the beacon sent from the access point in the radio communication system, the communication device comprising:
 a control unit that controls a participation in the network;
 a beacon receiving unit that receives the beacon transmitted by the access point; and
 a network-participation-procedure control unit that transmits a network participation request from the station based on a network-participation-procedure start request sent from the control unit, wherein
 the network-participation-procedure control unit transmits the network participation request from the station during a time period until the second time has passed in the access point after reception of the beacon that is transmitted at a longer interval than that in the normal operation mode, during operation of the access point in the power-saving operation mode.

7. The communication device according to claim 6, wherein the network is a basic service set in a wireless local area network system.

8. The communication device according to claim 6, wherein the network is a piconet in a wireless personal area network system.

9. A communication method implemented by a communication device that functions as an access point in a radio communication system when the access point notifies presence of a network to a communication device that functions as a station in the radio communication system by a beacon, the communication method comprising:
 switching to a power-saving operation mode, when a total number of stations participating in the network becomes zero or when no signal is received from any one of the stations participating in the network over a predetermined time period during operation in a normal operation mode, setting a transmission period of the beacon to be longer than a transmission period thereof in the normal operation mode, and setting all circuits other than a timer, which are related to data transmission/reception, to be in a sleep state;
 supplying power to circuits except a timer, a sleep control unit, and a control unit, at a timing earlier, by a first time, than a transmission timing of the beacon that is transmitted at a longer interval than that in the normal operation mode, during operation in the power-saving operation mode from the transmission timing of the beacon;
 setting the circuits to be in a sleep state after a second time has passed from the transmission timing of the beacon; and switching to the normal operation mode when the access point receives a network participation request from one of the stations during a time period from the transmission timing of the beacon to the passage of the second time, during operation in the power-saving operation mode, and returning the transmission period of the beacon to the transmission period in the normal operation mode.

10. The communication method according to claim 9, wherein the network is a basic service set in a wireless local area network system.

11. The communication method according to claim 9, wherein the network is a piconet in a wireless personal area network system.

* * * * *